Figure 1:
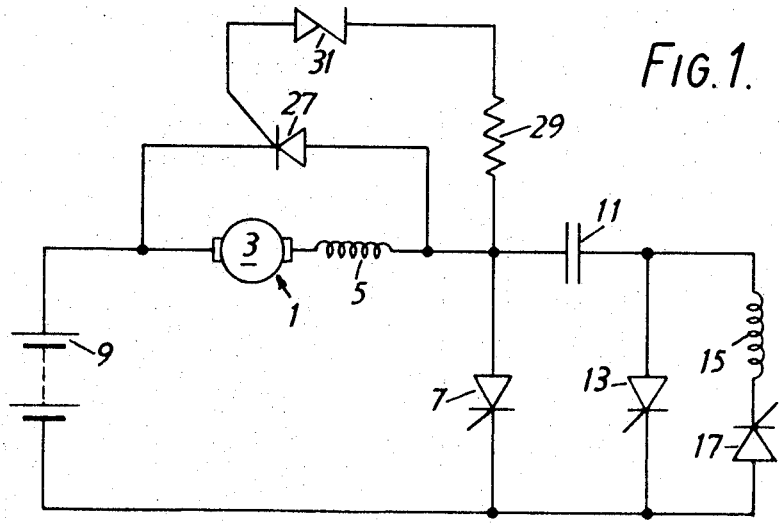

United States Patent

[11] 3,562,611

| [72] | Inventor | David Gurwicz<br>Gateshead, England |
|---|---|---|
| [21] | Appl. No. | 821,904 |
| [22] | Filed | May 5, 1969 |
| [45] | Patented | Feb. 9, 1971 |
| [73] | Assignee | Sevcon Engineering Limited<br>Dunham, England |
| [32] | Priority | May 13, 1968 |
| [33] | | Great Britain |
| [31] | | 22,592/68 |

[54] STATIC SWITCHING CONTROLLERS FOR EFFECTING REPETITIVE CONNECTION TO AND DISCONNECTION FROM AN INDUCTIVE LOAD OF A DC SOURCE
10 Claims, 7 Drawing Figs.

[52] U.S. Cl. .................................................. 318/246,
318/227, 318/231, 318/341; 321/45
[51] Int. Cl. ............................................................. H02k 23/08;
H02p 5/06
[50] Field of Search .................................................. 318/246,
249, 341, 345, 227, 231; 321/45C

[56] References Cited
UNITED STATES PATENTS

| 3,207,974 | 9/1965 | McMurray .................. | 321/45(E) |
| 3,242,352 | 3/1966 | Long ........................... | 321/45 |
| 3,341,759 | 9/1967 | Torii ............................ | 318/422 |
| 3,348,124 | 10/1967 | Cielo ........................... | 321/45 |

OTHER REFERENCES
I.B.M. TECHNICAL DISCLOSURE BULLETIN
Pages 31–32, Volume 6, No. 8, January 1964 (2 COPIES ATTACHED)

*Primary Examiner*—Benjamin Dobeck
*Assistant Examiner*—K. L. Crosson
*Attorney*—Browdy and Neimark ABSTRACT: Static switching controller using a thyristor to connect a DC source to a load there being provided control means to render the thyristor conducting, a commutating capacitor adapted to be charged from the source and to reverse bias the thyristor to terminate conduction thereof and means for preventing decay of the charge on the capacitor to a level below that required to commutate the thyristor, there being further provided a unidirectional load shunting current path which in the interval between successive periods of conduction of the thyristor operates to permit charging of the capacitor to a relatively high voltage level.

PATENTED FEB 9 1971

3,562,611

SHEET 3 OF 3

STATIC SWITCHING CONTROLLERS FOR EFFECTING REPETITIVE CONNECTION TO AND DISCONNECTION FROM AN INDUCTIVE LOAD OF A DC SOURCE

This invention relates to static switching controllers for effecting repetitive connection to and disconnection from an inductive load of a DC source. A typical example of the use of such a controller is in a battery driven vehicle where the controller serves as the link between the DC source provided by the vehicle battery and the inductive load consisting of the DC series traction motor of the vehicle.

The invention is more particularly concerned with static switching controllers for effecting repetitive connection to and disconnection from an inductive load of a DC source of the kind comprising a thyristor means so connected with the load and the source that when it is rendered conducting current flows from the source through the load, the periods of conduction of the thyristor means determining the mean current through the load, control means for rendering the thyristor means conducting, a commutating capacitor means for switching off the thyristor means and adapted to be charged from the source and to reverse bias the thyristor means to terminate conduction thereof, and, means for preventing decay of the charge on the capacitor means to a level below that required to switch off the thyristor means. Such static switching controllers are hereinafter referred to as static switching controllers "of the kind set forth."

With a controller of the kind set forth, the inductive nature of the DC source, usually a battery, causes the capacitor to forward charge to a voltage above that of the source and this excess voltage facilitates turn off of the thyristor means. Generally, the excess voltage on the capacitor arising from the inductive nature of the DC source is sufficient to enable the switching off of the thyristor means to be performed. However, with low power applications, where the currents involved are small, it is desirable to obtain excess voltage during forward charging of the capacitor over and above that attainable by virtue of the inductance of the source.

According to the present invention, in a static switching controller of the kind set forth, there is provided a unidirectional load shunting current path which, in the interval between successive periods of conduction of the thyristor means, is adapted to operate to permit charging of the commutating capacitor to a desired voltage level above that to which the capacitor would charge in the presence of a load shunting current path of negligible impedance being presented across the load instantaneously upon switching off the thyristor means.

Suitably, the load shunting current path which is provided includes a semiconductor device which is switched into conduction after the voltage level to which the commutating capacitor is forward charged has reached the desired level.

Preferably the semiconductor device of the load shunting current path is a thyristor which is rendered conducting when the forward charge on the commutating capacitor has reached a desired level. Suitably, a zener diode is so connected to the anode electrode of the load shunting thyristor and the gate electrode of the load shunting thyristor so that the load shunting thyristor is rendered conducting when the anode voltage of the load shunting thyristor exceeds its gate voltage by the zener diode at a predetermined time after commencement of forward charging of the commutating capacitor. However, it is preferable to use the zener diode because these circumstances conduction of the load shunting thyristor is tied to the attainment of a definite voltage on the commutating capacitor during forward charging thereof.

Alternatively the load shunting current path which is provided includes a unidirectional conduction device which is reverse biased by the voltage of the DC source and which is in series with an inductor and/or a resistor.

The invention will now be described, by way of example, by reference to the accompanying circuit drawings in which seven alternative forms of the invention are illustrated.

In the drawings like parts have been given the same reference numerals.

In one embodiment of the invention illustrated in FIG. 1 a DC series traction motor 1 having an armature 3 and field coils 5 is connected in series with a first or main thyristor 7 across a battery 9. The first thyristor 7 when supplied with current pulses at its gate electrode is rendered conducting and connects the battery 9 to the motor 1. Thus, the means current through the motor is determined by the periods of conduction, i.e. the "mark-space" ratio of the first thyristor. Shunting the first thyristor 7 is a commutating capacitor 11 which is in series with a second or turn off thyristor 13. The second thyristor 13 when rendered conducting by current pulses at its gate electrode serves, if the commutating capacitor 11 is uncharged, to effect forward charging of the capacitor and if, as is hereinafter described, the commutating capacitor is reverse charged, to effect discharge of the capacitor to switch off the first thyristor and, thereafter, forward charging once again from the source of the commutating capacitor.

Figure 2:
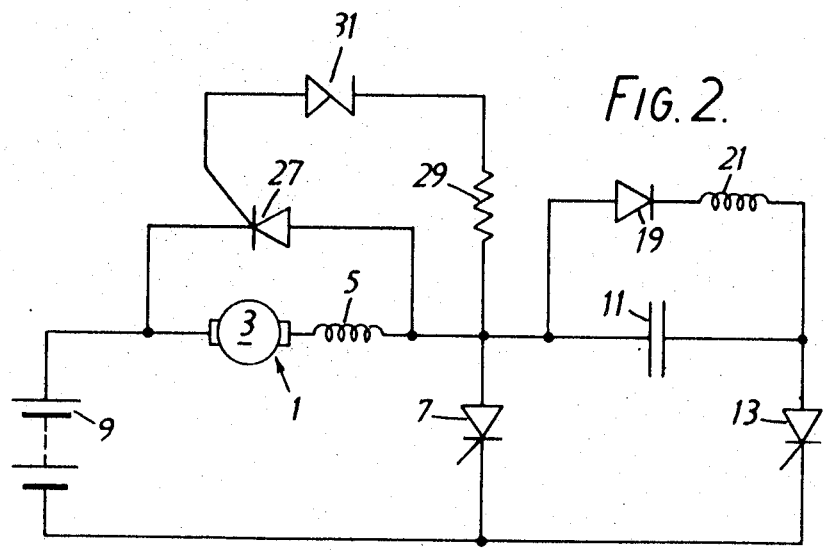
Figure 3:
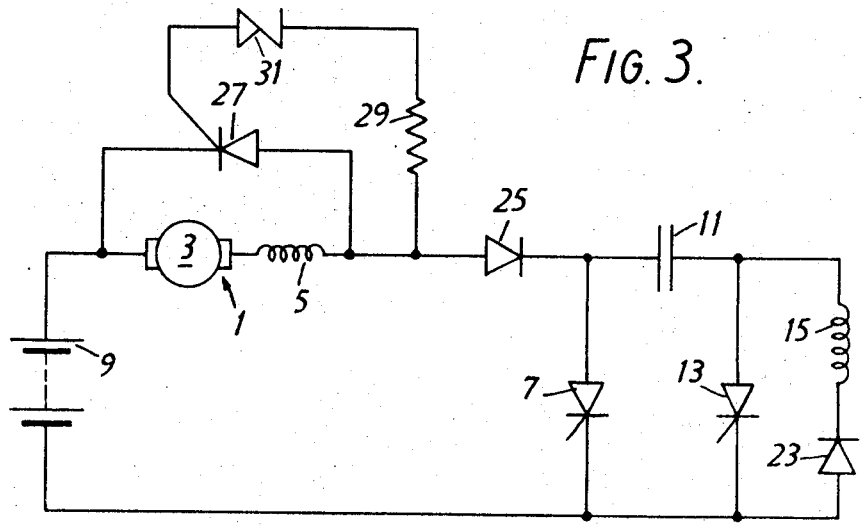

For effecting charge reversal on the commutating capacitor 11 there is connected across the second thyristor a series path comprising an inductor 15 and a third thyristor 17, the anode of which is in series with the cathode of the first thyristor 7, so that when both the first and third thyristors 7 and 13 are rendered conducting, the commutating capacitor 11 reverse charges by oscillatory current flow round the loop consisting of the commutating capacitor, the first and third thyristors and the inductor 15 in series with the third thyristor. It will be apparent that the third thyristor 17 is reverse biased and, therefore, turned off when the commutating capacitor is reverse charged via the inductor. Whilst the charge reversal means have been described as a third thyristor and a series inductor connected across the second thyristor, the charge reversal means could consist as depicted in FIG. 2 of a third thyristor 19 and a series inductor 21 connected in parallel with the commutating capacitor in which event the anode of the third thyristor 19 would be connected to the anode of the first thyristor. In this alternative position it will be appreciated that the third thyristor is reverse biased and therefore turned off upon the commutating capacitor being reverse charged. Instead of using a third thyristor such as thyristor 17 there can be employed as shown in FIG. 3 and as is illustrated and described in our Pat. No. 950,734 shunting the second thyristor a diode 23 in series with inductor 15. In this arrangement, however, a diode 25 has to be provided between the load and the common point of the first thyristor 7 and commutating capacitor 11 to prevent decay of charge on the commutating capacitor immediately after forward charging thereof by way of the second thyristor.

From the alternative circuits described, essentially what is required in the circuit is a commutating capacitor 11 which reverse biases the first or main thyristor 7 to terminate conduction thereof and a means of preventing decay of charge on the capacitor to a level below that required to switch off the first thyristor.

Shunting the load i.e. the motor 1 there is provided, in place of the usual free wheel diode which maintains motor current flow during nonconducting periods of thyristor 7, a thyristor 27 the anode of which is connected to the common point of the commutating capacitor 11 and the anode of the first thyristor 7. Also connected to this common point is a resistor 29 in series with the anode terminal of the zener diode 31, the cathode side of which is connected to the gate electrode of the load shunting thyristor 27. The resistor 29 in series with the zener diode ensures that the current therethrough is limited during the turn on period of the main thyristor.

In operation, immediately after discharge of the commutating capacitor 11 via the second thyristor 13 to turn off the first thyristor 7 the capacitor 11 forward charges until the potential of the plate of the capacitor connected to the anode of the zener diode 31 reaches a voltage which exceeds the gate electrode of the load shunting thyristor 27 by the zener break over voltage, the load shunting thyristor is rendered conducting and thereafter acts as a free wheel diode to maintain current flowing through the load until the first thyristor 7 is again rendered conducting. When this happens and when charge reversal of the commutating capacitor 11 takes place in consequence of the firing, as the case may be, of thyristors 17 or 19 or by virtue of the path through diode 23, the voltage level at the plate of the capacitor connected to the anode of the zener diode falls below the zener break over voltage and the potential at the gate of the load shunting thyristor 27 falls to zero, this thyristor being at this time reverse biased by the source potential and therefore turned off. It will be appreciated that the load shunting thyristor 27 only performs the function of a free wheel diode when the capacitor plate connected with the anode of the zener diode reaches, during forward charging of the capacitor, a voltage level which is of course above that of the positive side of the battery and which exceeds the battery positive voltage by the value of the zener break over voltage. By the appropriate choice of zener diode 31 the requisite excess voltage on the commutating capacitor is therefore obtained.

It will be appreciated that instead of using a zener diode the load shunting thyristor can be fired into conduction at a predetermined time after forward charging of the commutating capacitor has commenced. This method of firing the load shunting thyristor 27 is not as satisfactory as the use of the zener diode 31 as described since the voltage attained by the capacitor 11 when using the zener diode is independent of the load current flowing immediately before turn off of the first thyristor 7 whereas when the load shunting thyristor 27 is fired a predetermined time after forward charging of the commutating capacitor 11 has commenced, the voltage level attained by the commutating capacitor depends upon the load current flowing immediately before turn off of the first thyristor.

Figure 4:
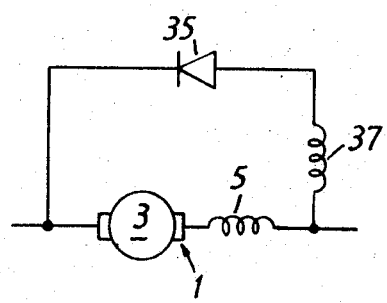
Figure 5:
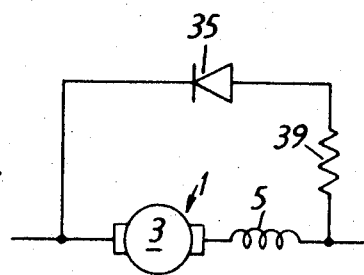

As an alternative to employing a load shunting thyristor there may be employed in a series path shunting the load, respectively as shown in FIG. 4 or FIG. 5 a free wheel diode 35 in series with an inductor 37 or a resistor 39. When inductor 37 is used, on switching off the first thyristor, the fly wheel diode cannot immediately pass the main motor current due to the blocking effect of the inductor 37 in series with the fly wheel diode 35. As the growth of current through this inductor has initially to rise, the motor current flow must initially therefore go into the commutating capacitor over charging it above the supply voltage. The blocking effect of the inductor 37 depends both on the value of the inductor and also on the value of the motor current flowing immediately prior to turn off of the first thyristor.

When resistor 39, instead of an inductor, is used in series with the fly wheel diode 35 it will be apparent that the fly wheel diode, will pass the full motor current only after the commutator capacitor voltage exceeds the battery voltage by the voltage drop across the resistor 39 in series with the fly wheel diode. Thus the commutator capacitor 11 over charges to a value above the battery voltage equal to the voltage drop across the resistor 39 and this voltage drop is dependent upon the current flowing through the load immediately prior to turn off of the first thyristor. It will be clear, therefore, that whether a resistor or an inductor is employed in series with the fly wheel diode the voltage level attained during forward charging of the commutating capacitor is dependent upon the motor current flowing immediately prior to turn off of the first thyristor. Accordingly, these methods of over charging the commutating capacitor, whilst satisfactory, are not to be preferred to the first embodiment described in which a load shunting thyristor 27 is triggered into conduction when the commutating capacitor voltage exceeds the voltage of the source by the break over voltage of the zener diode 31 connected between the gate electrode and the load shunting thyristor and the common point of the commutating capacitor 11 and anode of the first thyristor 7.

Figure 6:
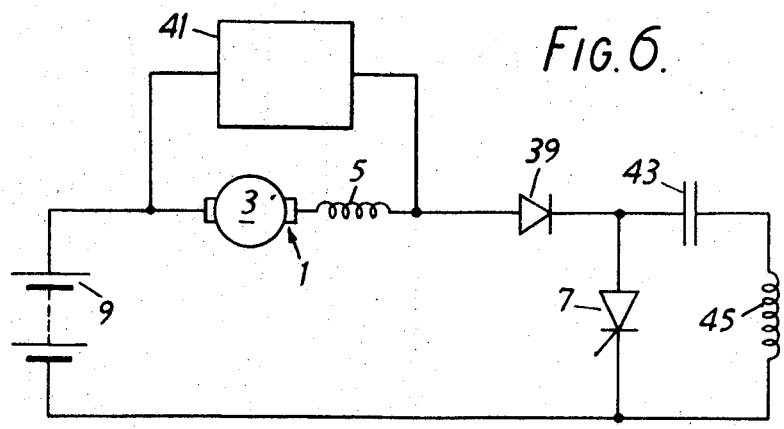

Whilst in the above embodiments there has been described a second thyristor 13 via which the first thyristor is switched off, the commutating capacitor 11 having previously been reverse charged, and whilst also reference has been made to a charge reversal circuit for the commutating capacitor, neither the second thyristor nor the commutating capacitor charge reversal circuit is absolutely necessary. Thus, in an alternative circuit illustrated in FIG. 6 a diode 39 is placed in series with the motor 1, the battery and the main switching thyristor 7, the motor being shunted by a load shunting current path of any of the forms mentioned above and generally indicated by reference number 41. Across the main switching thyristor 7 is a commutating capacitor 43 in series with an inductor 45. When the main switching thyristor 7 is off the capacitor 43 forward charges via the load i.e. the motor 1, the diode 39 and the inductor 45. The main switching thyristor 7, when turned on, connects the motor to the battery and conducts oscillatory discharge current from the capacitor which becomes reverse charged. The capacitor then discharges so turning off the main switching thyristor 7 and forward charges once again via the motor 1, the diode 39 and the inductor 45. This circuit does not therefore require a second thyristor. Also it will be apparent that the series diode prevents charge decay on the commutating capacitor 43 following forward charging thereof.

Figure 7:
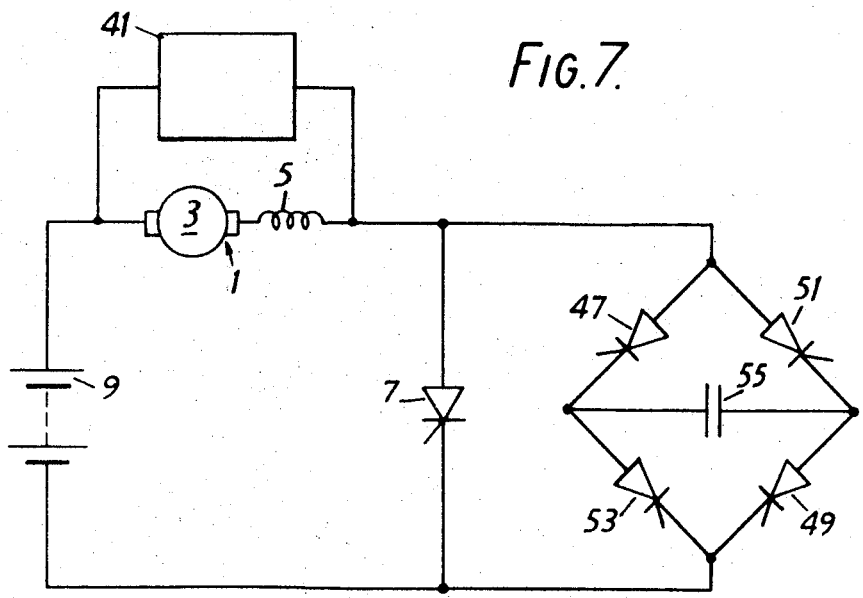

In a further circuit which is illustrated in FIG. 7 the motor 1 and main switching thyristor 7 are connected in series across the battery 9, the motor being shunted by the load shunting current path 41 which as intimated above can be of any of the forms previously described. Across the switching thyristor 7 are connected opposite corners of a bridge of four further thyristors 47, 49, 51 and 53. The corners of the bridge not connected across the main switching thyristor are connected to a commutating capacitor 55. The arrangement of the further thyristors is such that when the thyristors in opposite arms of the bridge are conducting the commutating capacitor is connected in one sense across the main switching thyristor whilst when the further thyristors in the other arms of the bridge are rendered conducting the commutating capacitor is connected across the main thyristor in the opposite sense. It will be apparent therefore that when the pair of thyristors 47 and 49 is rendered conducting the capacitor 55 is charged in a first sense and when the other pair of thyristors 51 and 53 of the bridge is rendered conducting the commutating capacitor 55 is presented to the main switching thyristor with its positively charged side to the cathode of the main switching thyristor so that the latter is turned off whereupon the commutating capacitor in a second sense which is the reverse of the first sense via the same thyristors 51 and 53 through which it discharges to turn off the main thyristor. It will be apparent from this circuit that a charge reversal path is not therefore essential, and that as the charging of the capacitor via either pair of thyristors 47, 49 or 51, 53 brings the capacitor to a voltage above battery voltage by reason of inductance in the charging circuit, the tendency for the capacitor then to discharge turns off the thyristors in the capacitor path. The particular pair of further thyristors which at any time is in the capacitor charging path serves, it will be appreciated, to prevent charge decay on the commutating capacitor.

Those skilled in the art will of course understand that control circuit means in the form of pulse supplying oscillators are provided for each of the embodiments of the invention described to fire the main thyristor 7 into conduction and also to fire where present (with the exception of thyristor 27 which automatically fires when the zener voltage is exceeded) the other thyristors into conduction in appropriate relation to the firing of thyristor 7. It will also be understood that the invention is applicable to inductive loads other than DC series motors. For example, it may be employed in the control of the field current of a separately excited motor and in other inductive loads, e.g. transformers.

Other variations will suggest themselves to those skilled in the art. Thus in the case of low current applications the load can be shunted by a transistor which is rendered heavily conducting when the commutating capacitor charge reaches the desired level.

I claim:

1. A static switching controller for effecting repetitive connection to and disconnection from an inductive load of a DC source comprising a main thyristor means connected in series with the load and the source and operative when conductive to permit current flow from the source through the load, the periods of conduction of the main thyristor means determining the mean current through the load, control means for rendering the main thyristor means conducting, thyristor conduction termination means connected to terminate conduction of said thyristor, said conduction termination means including a commutating capacitor means for switching off the main thyristor means connected to be forward charged from the source between successive periods of conduction of the main thyristor means, said commutating capacitor means being connected to reverse bias the main thyristor means to terminate conduction thereof and means for preventing decay of the charge on the capacitor means to a level below that required to switch off the main thyristor means, said charge decay preventing means including a unidirectional load current shunting path connected across the load so as to conduct the load current in the interval between successive periods of conduction of the main means, said load current shunting path including delay means for delaying the conduction of the full load current in said load current shunting path after commutation of the main thyristor means to permit enhanced charging of the commutating capacitor.

2. A controller as claimed in claim 1, wherein the load shunting current path includes a semiconductor switching device and the delay means is connected between the commutating capacitor and said switching device and operates to switch the switching device into conduction after the voltage level to which the commutating capacitor is forward charged has reached a desired level.

3. A controller as claimed in claim 2, wherein the semiconductor switching device is a thyristor having an anode connected to the commutating capacitor and a gate electrode, and the delay means comprises a zener diode connected in a path between the anode of the load shunting thyristor and the gate electrode of the load shunting thyristor so that the load shunting thyristor is rendered conducting when the anode voltage of the load shunting thyristor exceeds its gate voltage by the zener diode voltage.

4. A controller as claimed in claim 3, wherein the zener diode is disposed in said path in series with a current limiting resistor which serves to limit current in the zener diode whilst the main thyristor means is conducting.

5. A controller as claimed in claim 1 wherein reverse charging circuit means are connected to said commutating capacitor means to reverse charge said commutating capacitor means during conduction of said main thyristor means.

6. A controller as claimed in claim 1 wherein said thyristor conduction termination means includes a second thyristor means connected in series with said commutating capacitor means across said main thyristor means, said second thyristor means operating when conductive to pass the reverse charge from said commutating capacitor means to cause said main thyristor means to cease conduction.

7. A controller as claimed in claim 6 wherein said reverse charging circuit means includes a reverse control thyristor and an inductor connected in series between said main thyristor means and said commutating capacitor means.

8. A controller as claimed in claim 6 wherein the reverse charging circuit means includes an inductor connected in series with a reverse control thyristor in parallel with said commutating capacitor means, the anode of said reverse control thyristor being connected to a common point between said main thyristor means and said commutating capacitor means.

9. A controller as claimed in claim 5 wherein the reverse charging circuit means includes an inductor connected between said main thyristor means and said commutating capacitor means.

10. A controller as claimed in claim 1 wherein said thyristor conduction termination means includes thyristor bridge circuit means connected to said commutating capacitor means and shunting said main thyristor means, said thyristor bridge circuit means including bridge thyristors in each arm thereof and operating upon conduction of a first set of bridge thyristors in opposite arms to connect said commutating capacitor means across said main thyristor means in a first sense and upon conduction of a second set of bridge thyristors in opposite arms to connect said commutating capacitor means across said main thyristor means in a second sense opposite to said first sense.

PO-1050
(5/69)

UNITED STATES PATENT OFFICE
CERTIFICATE OF CORRECTION

Patent No. 3,562,611　　　　　　　　Dated February 9, 1971

Inventor(s) DAVID GURWICZ

It is certified that error appears in the above-identified patent and that said Letters Patent are hereby corrected as shown below:

Column 1, line 61, insert --voltage. Instead of usir the zener diode the load shunting thyristor can be rendered conducting-- after the word "diode".

Column 1, line 63, after "because" insert --in--.

Column 4, line 51, after "capacitor" insert --chargir

Claim 1, column 5, line 19, after "main" insert --thyristor--.

Signed and sealed this 22nd day of February 1972.

(SEAL)
Attest:

EDWARD M. FLETCHER, JR.　　　　ROBERT GOTTSCHALK
Attesting Officer　　　　　　　　Commissioner of Patents